(No Model.)
J. W. LEGGITT.
MEAT HOOK.
No. 336,123.  Patented Feb. 16, 1886.
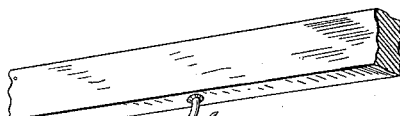
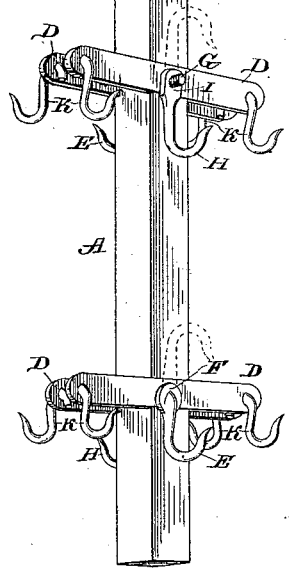
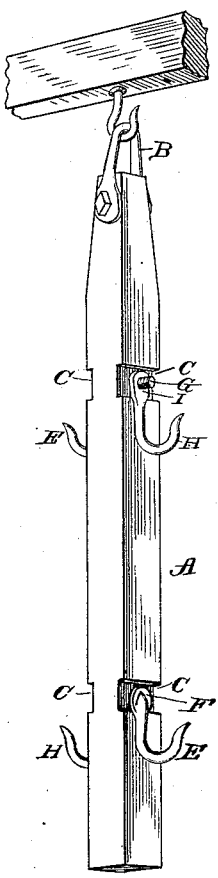
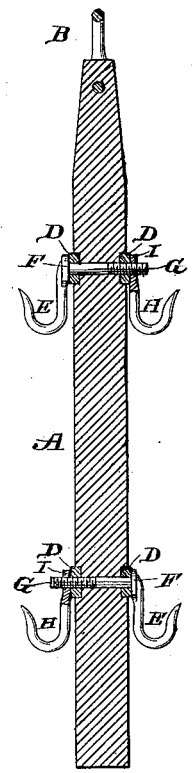
Fig. 1.
Fig. 2.
Fig. 3.
WITNESSES
Percy C. Bowen.
J. W. Garner
INVENTOR
John W. Leggitt.
By C. A. Snow & Co.
his Attorneys.

UNITED STATES PATENT OFFICE.

JOHN WHITICE LEGGITT, OF SHARON, MISSISSIPPI.

MEAT-HOOK.

SPECIFICATION forming part of Letters Patent No. 336,123, dated February 16, 1886.

Application filed October 12, 1885. Serial No. 179,700. (No model.)

*To all whom it may concern:*

Be it known that I, JOHN W. LEGGITT, a citizen of the United States, residing at Sharon, in the county of Madison and State of Mississippi, have invented a new and useful Improvement in Meat-Hangers, of which the following is a specification, reference being had to the accompanying drawings.

My invention relates to an improvement in meat-hangers; and it consists in the peculiar construction and arrangement of devices that will be more fully set forth hereinafter, and particularly pointed out in the claims.

In the drawings, Figure 1 is a perspective view of a meat-hanger embodying my invention. Fig. 2 is a similar view of the same with the cross-bars detached. Fig. 3 is a detailed vertical sectional view.

A represents a vertical standard, of suitable length, having a loop, B, at its upper end, by which it may be hung from the rafters of the smoke or store house. On opposite sides of this standard, at suitable distances apart, are made horizontal transverse mortises or grooves C, in which are placed cross-bars D.

E represents meat-hooks, having shoulders or washers F, and horizontal shanks G extending therefrom, which shanks are passed through transverse openings made through the cross-bars and the standard, and have their extending ends provided with screw-threads.

H represents meat-hooks, having eyes I interiorly screw-threaded, and screwed onto the threaded ends of the shanks to clamp the cross-bars and the standard firmly together. By this construction the hooks may be turned in a reverse position, as shown in dotted lines in Fig. 1. In the ends of the cross-bars are fastened hooks K, which may be likewise reversed when desired. When it is not desired to employ all the hooks, and where large pieces of meat are to be hung, when the hooks on the cross-bars would be in the way, the cross-bars may be removed by first removing the hooks E and H, and then the latter replaced, as shown at Fig. 2.

When it is desired to sack the meat to protect it from insects while hanging, a piece of cloth, equal in length to the standard, will be sewed up lengthwise in the form of a long sack or bag, and drawn over the meat as it hangs, and fastened at top and bottom.

Wooden pins may be employed instead of the hooks K in the cross-bars, if preferred.

Having thus described my invention, I claim—

1. The combination of the standard, the hooks E, having the horizontal shank passed through the standard, and the hook H, secured on the projecting end of the shank, whereby the said hooks E and H may be reversed, substantially as described.

2. The combination of the standard, the cross-bars, the hooks E, having horizontal shanks passed through the cross-bars and standard, and the hooks H, having eyes fitting on the ends of the shanks, substantially as described.

3. The combination of the standard, the cross-bars, the hooks E, having horizontal shanks with threaded ends passed through the cross-bars and standard, and the hooks H, having threaded eyes screwed onto the threaded ends of the shanks, substantially as described.

In testimony that I claim the foregoing as my own I have hereto affixed my signature in presence of two witnesses.

JOHN WHITICE LEGGITT.

Witnesses:
WM. MCWILLIE,
H. C. LUCKETT.